(12) United States Patent
Niessen

(10) Patent No.: US 9,981,705 B2
(45) Date of Patent: May 29, 2018

(54) APPARATUS AND METHOD FOR THE ALIGNMENT OF AN ATTACHMENT ON A VEHICLE

(71) Applicant: FORD GLOBAL TECHNOLOGIES, LLC, Dearborn, MI (US)

(72) Inventor: Hubert Niessen, Heimbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 14/823,456

(22) Filed: Aug. 11, 2015

(65) Prior Publication Data

US 2016/0046337 A1 Feb. 18, 2016

(30) Foreign Application Priority Data

Aug. 18, 2014 (DE) .................. 10 2014 216 332

(51) Int. Cl.
| | |
|---|---|
| *B60Q 1/00* | (2006.01) |
| *B62D 65/00* | (2006.01) |
| *B60Q 1/04* | (2006.01) |
| *G01B 5/00* | (2006.01) |
| *G01B 5/25* | (2006.01) |

(52) U.S. Cl.
CPC .......... *B62D 65/005* (2013.01); *B60Q 1/045* (2013.01); *G01B 5/0025* (2013.01); *G01B 5/25* (2013.01)

(58) Field of Classification Search
CPC ...... B62D 65/005; G01B 5/25; G01B 5/0025; B60Q 1/045
See application file for complete search history.

(56) References Cited

U.S. PATENT DOCUMENTS 7,644,966 B2 * 1/2010 Huber ................ B60Q 1/0433
293/155

FOREIGN PATENT DOCUMENTS

| DE | 102009006773 A1 | 8/2009 |
| DE | 102009058559 A1 | 7/2010 |

OTHER PUBLICATIONS

English machine translation for DE102009006773.
English machine translation for DE102009058559.

* cited by examiner

*Primary Examiner* — Richard Chang
(74) *Attorney, Agent, or Firm* — Jason Rogers; King & Schickli, PLLC

(57) ABSTRACT

An apparatus is provided for the alignment of an attachment relative to at least one adjacent structural part on the body side on a vehicle. For the improvement of a tolerance compensation between the attachment and the structural part during assembly, it is proposed that the apparatus is part of the structural part, while the attachment comprises at least one first reference point for the alignment of the attachment, wherein the first reference point is incorporated in the attachment by means of a gauge before the installation of the attachment.

15 Claims, 5 Drawing Sheets

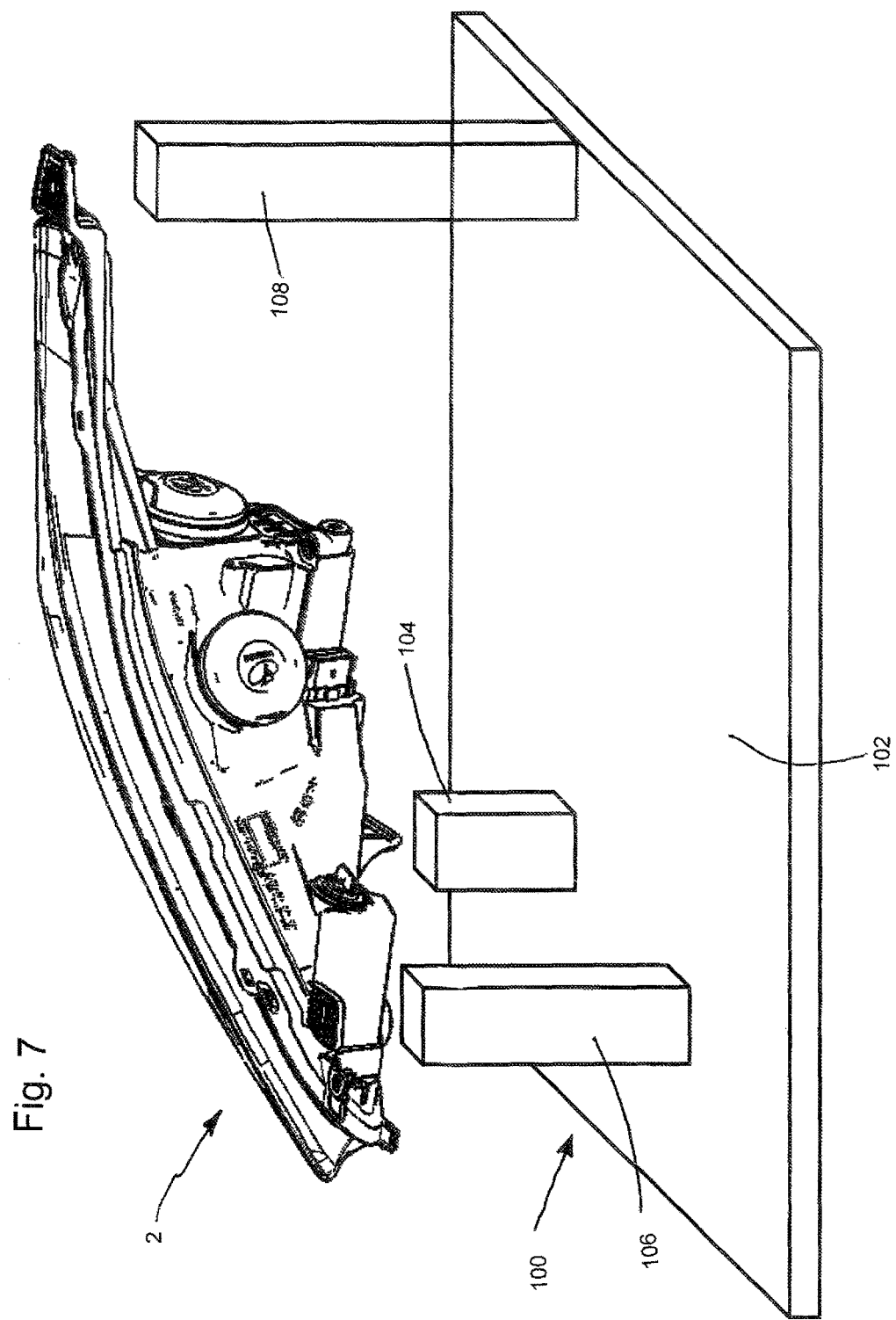

APPARATUS AND METHOD FOR THE ALIGNMENT OF AN ATTACHMENT ON A VEHICLE

TECHNICAL FIELD

This document relates generally to an apparatus for the alignment of an attachment relative to at least one adjacent structural part on the body side on a vehicle.

BACKGROUND

In general, when assembling the paneling parts of a vehicle there is the problem that during insertion tolerances of the paneling parts can add up unfavorably with the formation of gaps and inadequate fits, so that they no longer meet today's usual gap and fit requirements. For example, headlamp tolerances are a constant source of variations with a strong influence on the appearance of the front end. As a remedy for this, module installations with alignment operations that enable a certain tolerance compensation by means of oversize holes, hollow screws or other tolerance compensation devices (so-called WITOL® elements) are known from vehicle construction. However, this causes additional fitting operations, as well as investment and item costs.

For example, the use of an alignment and fixing device with a latching device comprising a plurality of latching positions, by means of which the attachment can be oriented relative to an adjacent structural part of the vehicle in one of the latching positions, is proposed in DE 10 2009 058 559 A1 for tolerance compensation.

A fixing module with a plurality of connecting elements for fixing a light on a motor vehicle front end support is described in DE 10 2009 006 773 A1, wherein the fixing module is connected by means of the connecting elements to the light and paneling components adjacent thereto.

SUMMARY

In accordance with the purposes and benefits described herein, an apparatus is provided for the alignment of an attachment, by means of which a tolerance compensation between the attachment and the structural part can be improved further. Furthermore, the cost of installation of the attachment during the assembly of the vehicle should be reduced by means of the apparatus.

The stated object is solved in that the apparatus is part of the structural part, in that the attachment comprises at least one first reference point for the alignment of the attachment and the first reference point is incorporated in the attachment by means of a gauge before the installation of the attachment.

An additional fixing module or similar can thus be omitted. Whereas according to the state of the art the alignment of the attachment is carried out by the additional apparatuses during assembly, and hence increases a corresponding assembly time, said alignment can be performed by means of the invention away from an assembly line for the vehicle, such as for example by a supplier of the structural part, and hence the structural part can be installed in the vehicle together with the at least one first reference point oriented in the gauge and the attachment can be aligned with said at least one first reference point. This allows the assembly accelerating concept to be satisfied, according to which if possible no alignment should take place during assembly, but only the assembly itself. Thus the only cost required is the manufacture of a gauge, which could however also be used for other vehicle models with any modifications. In practice, by means of the invention tolerances could be achieved that are several times smaller than tolerances that usually occur during the installation, for example, of a headlamp on a bumper of a front end module. An optimal fit can thus be achieved between the attachment and the structural part during the installation of the attachment in the body. The optimization of the tolerances away from the assembly of the vehicle, for example at a suitable supplier's premises, also has the advantage that full monitoring with a clear good/bad decision for optimized tolerances is possible at the supplier's premises. For this purpose, one-time investment costs enable long-term use.

In particular, the gauge can be configured to be adjustable to certain dimensions of the headlamp, so that no or only low consequential costs are possible with successor modules. Preferably, the first reference point is configured for alignment of the attachment in the X direction of the vehicle.

In a development of the apparatus, the first reference point can be in the form of a reference opening. Said reference opening can for example be incorporated in the attachment by means of a conventional technique for the introduction of an opening into preferably a plastic, such as by ultrasonic melting, drilling, stamping, milling or energy beam melting by means of laser beams or electron beams. Advantageously, the reference opening can just have a circular cross-section. Accordingly, the attachment can comprise a connection that is adapted to the first reference point for engaging the structural part, for example in the form of a pin for engaging in the reference opening.

In a further embodiment of the apparatus, the reference opening can be incorporated for its alignment in a groove preferably extending in the X direction. Said groove can advantageously already determine a region and a direction in which the reference opening is to be incorporated. For further orientation for the incorporated of the reference opening, it can be provided that the width of the groove is slightly larger than or equal to the diameter of the reference opening.

According to one of the previously described or following embodiments for the alignment of the attachment relative to at least one adjacent structural part on the body side on a vehicle, the alignment of an attachment relative to at least one adjacent structural part on the body side on a vehicle can thus be carried out by means of the apparatus using a simple method. Insertion of the structural part on its provided nominal holder into the gauge can take place initially and the incorporation of the at least one first reference point for the attachment in the structural part can then take place. The structural part with the already introduced first reference point can be easily stockpiled and brought to the installation point as required. The installation of the structural part in the vehicle can then be carried out at the installation point. Then the alignment of the attachment can be carried out by contact with the first reference point on the structural part. The structural part can hereby comprise a preferably factory-provided connection, which is adapted to the first reference point. It is understood that following the incorporation of the at least one first reference point, removal of the structural part from the gauge can be carried out.

In a development of the apparatus, it can be provided that the structural part comprises second reference points for its alignment in the X, Y and/or Z directions. Hereby it can be provided that at least one of the second reference points is designed to be adjustable in relation to its assigned vehicle direction or its assigned vehicle directions. The structural part can thus already be aligned in the gauge at its second reference points for example. In this way tolerances can already be correspondingly minimized in relation to the structural part, since the structural part can be aligned at its second reference points. Possible tolerances can thus only depend on the tolerances occurring in the gauge, which can occur during the incorporation of the at least one first reference point in the structural part by means of the gauge.

At least one of said second reference points can be in the form of a nominal holder for the structural part. Nominal holders are the usually provided holders of the structural part, in which the same is supported on the vehicle.

In particular, a second reference point can be designed as an XYZ reference point for alignment in the X direction, Y direction and Z direction, a further second reference point can be designed as an YZ reference point for alignment in the Y direction and Z direction and a further second reference point can be designed as a Z reference point for alignment in the Z direction. According to the 3-2-1 principle, the structural part can thus be adjusted in relation to all 6 possible degrees of freedom (three spatial axes: translation and rotation). Obviously, a different system from the 3-2-1 system can also be used for the alignment in all 6 degrees of freedom.

The XYZ reference point can be a cross pin extending in the Z direction with perpendicularly crossing ribs extending in the X direction or in the Y direction as well as a contact surface that is positionally variable in the Z direction. Hereby the cross pin can preferably extend in the negative Z direction away from the contact surface and the contact surface can extend in the Z direction. As a counterpart to the cross pin, the structural part, on which the XYZ reference point is supported, can comprise a preferably rectangular opening in which the cross pin engages in the Z direction. The YZ reference point can comprise an oblong hole extending in the X direction and also a contact surface that is positionally variable in the Z direction. As a counterpart to the oblong hole, the structural part, on which the YZ reference point is supported, can comprise a transverse rib extending in the YZ plane, which can have material removed in the Y direction and which engages in the oblong hole in the Z direction. The Z reference point can also comprise a contact surface that is positionally variable in the Z direction. Obviously, other design options are also conceivable here, each of which enables a variation of the reference point in the vehicle direction or vehicle directions assigned thereto.

In a further embodiment of the apparatus, the attachment can be a front end module comprising at least one paneling part of a bumper and/or the structural part can be a headlamp. The headlamp can comprise a housing and a lens, wherein the second reference points can be disposed on the housing and/or the lens. Which of these is optimal depends among other things on the desired fit. If for example it is provided that the fit is between the headlamp and the bumper, then an alignment directly with the headlamp lens is advantageous, since the second reference points are disposed on the same. In this case it is not provided that the second reference points form nominal holders for the structural part. The nominal holders can be part of the housing.

In one embodiment of the apparatus, at least one of the nominal holders of the headlamp can also form a second reference point. Preferably, the XYZ reference point for the removable part in the form of a headlamp is supported on a fender associated with said headlamp, the YZ reference point is supported on the front end module support and/or the Z reference point is supported on the associated bumper.

For the alignment of the front end module, two headlamps can each be provided with at least one first reference point. The first reference points of the two headlamps can be spaced apart from each other in the Y direction and/or in the Z direction in the installation position here. Preferably, the first reference points of the two headlamps are at the same height in the X direction.

According to the embodiments of the apparatus described above, it can be provided that following the insertion of the structural part in its nominal holder in the gauge and prior to the introduction of the at least one reference point in the structural part, an adjustment of the second reference points is carried out to adjust the structural part in the gauge.

It can be provided that the two structural parts, after they have each been provided with at least one first reference point for the attachment in the gauge, are installed in the vehicle such that the reference points are spaced apart from each other in the installation position in relation to at least one vehicle direction, which is not the same as the vehicle direction that is associated with the at least one reference point.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof. In the drawing figures:

FIG. 7 is an exploded perspective view illustrating a vehicle attachment, in the form of a headlamp, overlying a gauge or fixture for identifying reference points on the attachment.

Reference will now be made in detail to the present preferred embodiments of the apparatus for the alignment of an attachment, examples of which are illustrated in the accompanying drawing figures.

DETAILED DESCRIPTION

Figure 6:
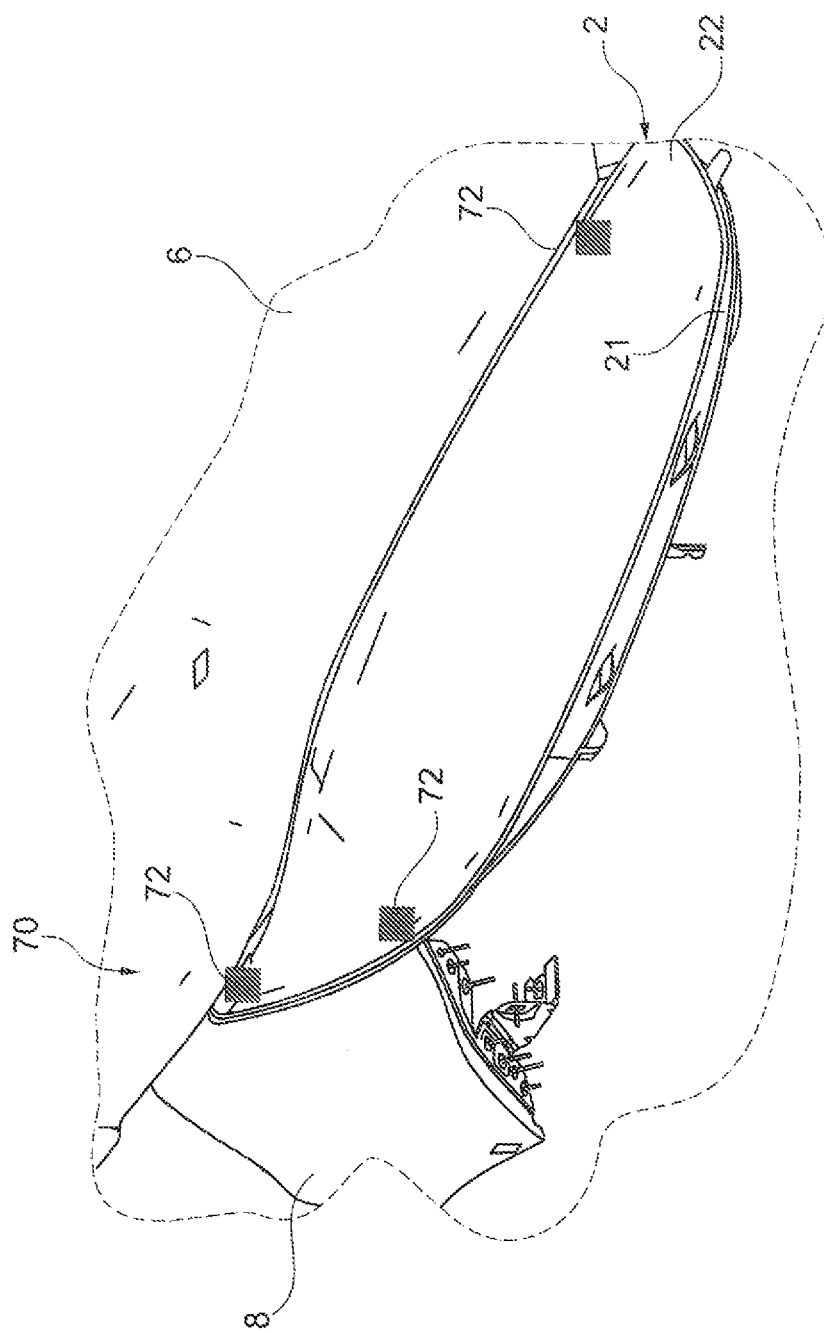
FIG. 6 is a perspective top view of the headlamp with a second embodiment of the apparatus for the alignment of an attachment.

Reference is now made to FIGS. 1 to 4 and 6 showing, in various views and sections, a front end 1 with headlamps 2 as structural parts 3 and a bumper 4 of a front end module that is not shown further here as an adjacent attachment 5 on the body side (FIGS. 1 to 4) or a hood 6 or a fender 8 as an adjacent attachment 5 on the body side (FIG. 6).

Apparatus 70 for the alignment of the respective associated adjacent attachment 5 is provided, which, without wishing to restrict the invention thereto, is disposed here on the headlamps 2 as structural parts 3. The apparatus 70 comprises on each of the headlamps 2 at least one first reference point 71 to which the attachment 5 is oriented during installation.

The first reference point 71 is introduced into the headlamp 2 by means of a gauge that is not shown explicitly here before installation of the headlamp 2, wherein the headlamp 2 on its provided nominal holder 20 (FIG. 5) is mounted in the gauge for this purpose and is provided with the at least one first reference point 71. Here the first reference point is in the form of a reference opening 72, which is introduced by drilling. Instead of drilling, any other suitable technique for the introduction of the reference opening 72 can be used.

Figure 1:
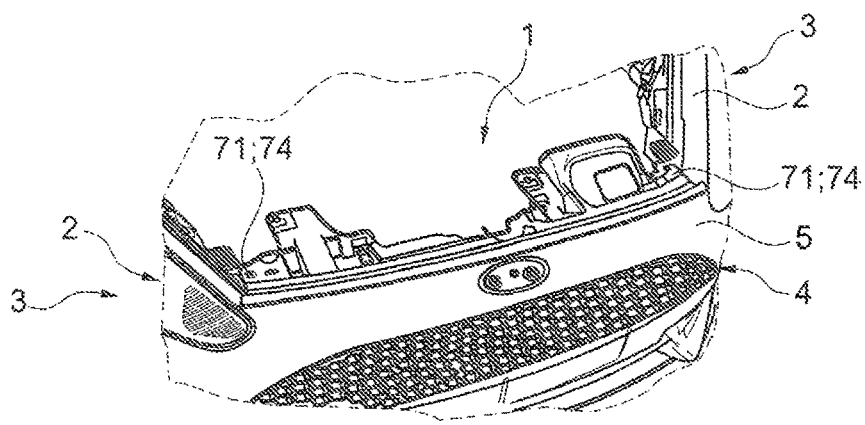
FIG. 1 is a perspective top view of a front end of a vehicle with a bumper, headlamps and a first embodiment of the apparatus for the alignment of an attachment for each headlamp.
Figure 2:
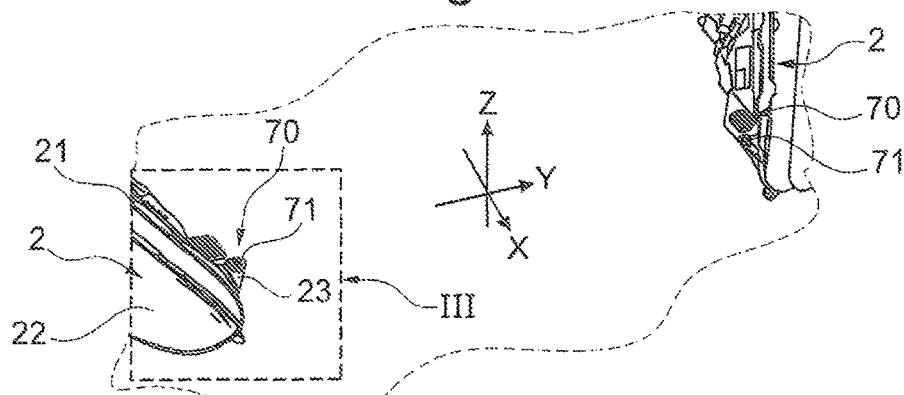
FIG. 2 is a perspective top view of the front end of the vehicle according to FIG. 1, but without a bumper.
Figure 3:
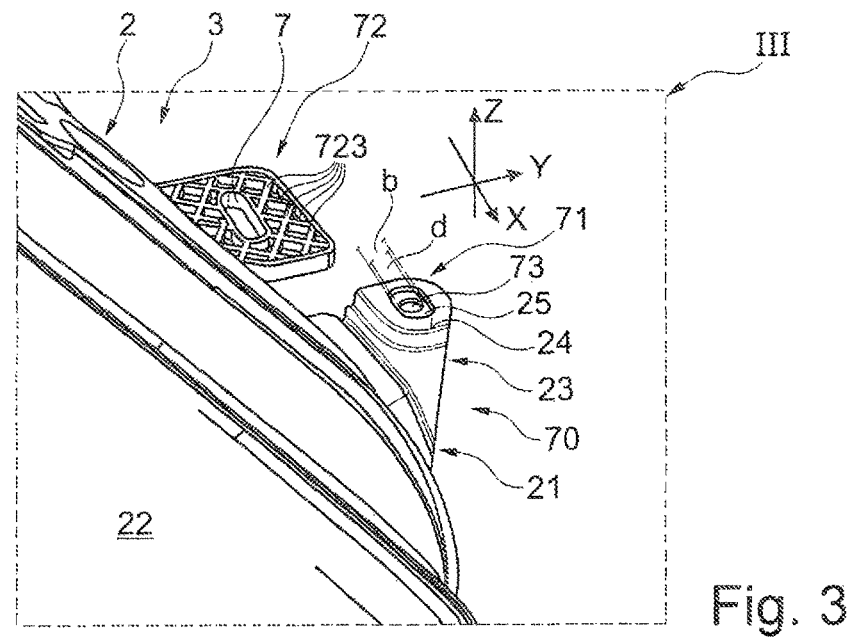
FIG. 3 is an enlarged detail III according to FIG. 2.

The position and form of the at least one first reference point 71 according to the first embodiment of the apparatus 70 can in particular be clearly seen in FIGS. 2 and 3. In FIG. 1 a further possibility for the positioning of the first reference points 71 is shown.

The headlamps 2 each comprise a housing 21 and a lens 22, wherein the first reference point 71 of the first embodiment of the apparatus 70 is disposed on the housing 21. Here a protrusion 23, which comprises an end face 24 facing in the Z direction z, is already formed on the housing 21 within the design of the housing 21. A groove 25 is machined into said end face 24 and extends in the X direction x in the installation position of the headlamp 2 in the gauge as well as also in a vehicle that is not shown here. With the structural part on its nominal holder 20 held in the gauge, the first reference point 71 can be introduced into the groove 25, wherein the position of the first reference point 71 is predetermined by the gauge.

The first reference point 71 is designed here as a tolerance compensation in the X direction x. This is indirectly indicated in the figures by the first reference point 71 being introduced centrally into the groove 25 in FIG. 3 and offset from the center of the groove 25 in FIG. 4. The provision of the groove 25 on the end face 24 already provides a first control of the positioning of the first reference point 71 in the Y direction y and in the Z direction z. The tolerance compensation is thus only carried out in the X direction x. At the same time, the alignment of the groove 25 in the vehicle directions x,y,z is used as an aid for checking whether the headlamp 2 is disposed in the gauge as prescribed. The same applies to the diameter d of the reference opening 73, which is circular in this case and slightly smaller than the width b of the groove 25.

According to FIG. 6, here optionally three second reference points 72 are shown, which in this case are indicated very schematically on the lens 22 of the headlamp 2. The option to dispose the second reference points 72 on the lens 22 is in particular of advantage if an optimized fit to the hood 6 and to the fender 8 adjacent to the headlamp 2 is desired, wherein additionally a further first reference point 71, as shown in FIGS. 2 and 3, can also be incorporated on the housing 21 in order to produce an optimized fit of the headlamp 2 to the front end 1 or to the bumper 4.

Figure 5:
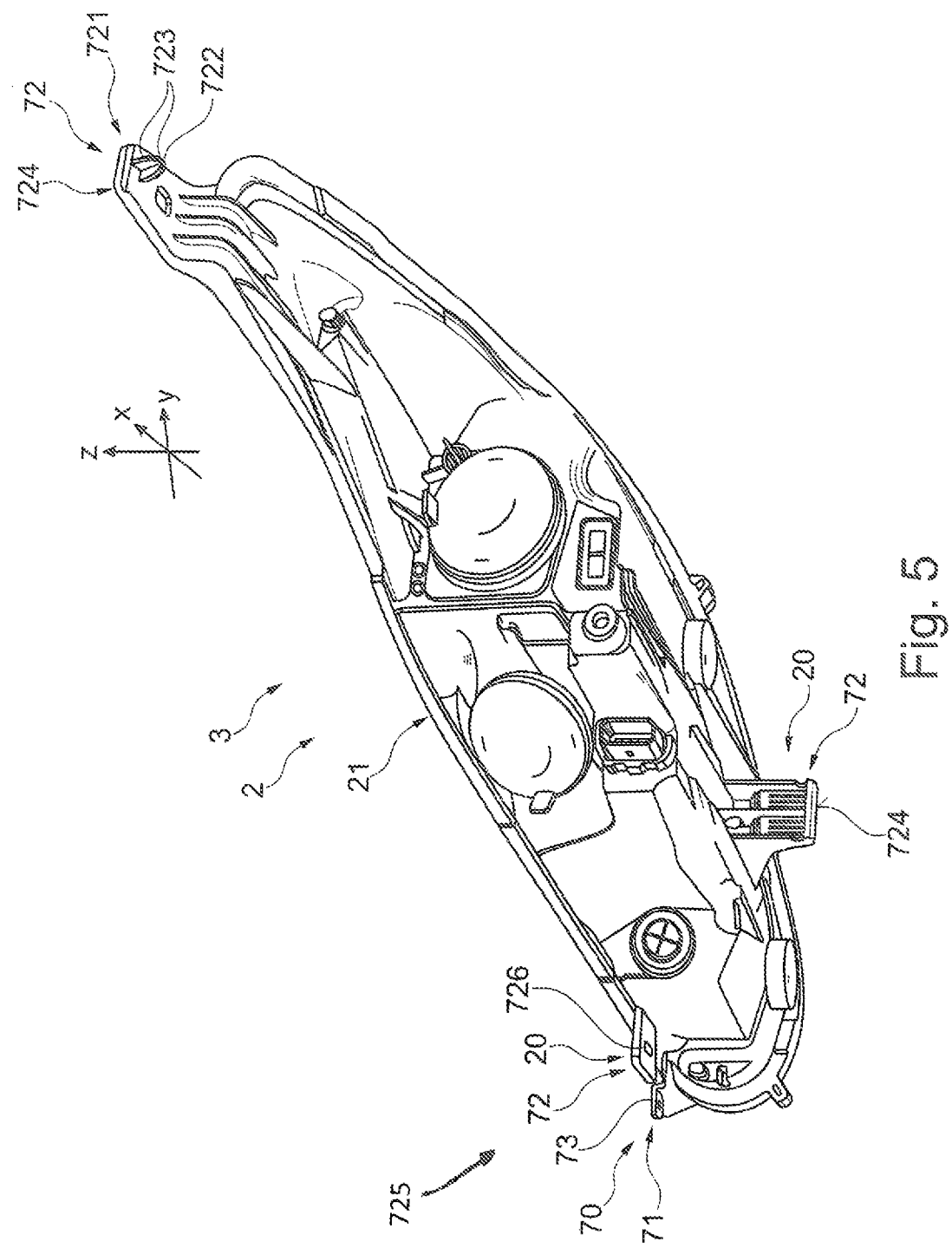
FIG. 5 is a perspective bottom view of a headlamp with a housing and without a lens.

The nominal holders 20 shown in FIG. 5 are in the form of second reference points 72 here at the same time. Said second reference points 72 are additionally adjustably formed here in relation to their alignment in their respective assigned vehicle directions x, y, z. Said measure allows the headlamp 2 to be exactly aligned in the gauge, so that tolerances occurring in relation to the position of the first reference point 71 ultimately only depend on the tolerances of said gauge.

The second reference points 72 are designed here such that, using the same, the headlamp 2 can be exactly oriented relative to all 6 possible degrees of freedom. In this case a so-called 3-2-1 principle is followed in order to allow proper alignment of the headlamp 2 on its nominal holder 20. The adjustment of the second reference points 72 is carried out for example by producing each one oversized in the injection molding process and removing material down to nominal size for the alignment of the headlamp 2 or, as with the first reference point 71, by incorporating a suitable reference opening 73 with correction of the respective tolerance. This means that the nominal holders 20 are thus adjusted to the tolerances and hence to the deviations of the geometry of the headlamp 2.

In the exemplary embodiment shown here of the apparatus according to FIG. 5, a second reference point 72 is in the form of an XYZ reference point 721 for alignment in the X direction x, Y direction y and Z direction z. For this purpose, the XYZ reference point 721 comprises a cross pin 722 with crossing ribs 723 extending in the X direction x and the Y direction y and a contact surface 724 whose position is variable in the Z direction z. Said positional variability of the contact surface 724 is provided, as shown for example in FIG. 3 in the example of a further second reference point 72 with a contact surface 724, by the contact surface 724 comprising a so-called honeycomb pattern with crossed ribs 723 in the Z direction z, which can be milled to adjust it to nominal size, wherein in the installation position said contact surface 724 abuts a contact surface facing in the Z direction z (not shown) that is provided here on the fender 8. Accordingly, the ribs 723 of the cross pins 722 that are made oversized also have material removed in the X direction x or in the Y direction y to achieve the nominal size, wherein in the installation position said ribs engage in a square opening (not shown) provided in the fender 8.

For precise fixing of the headlamp 2 on its nominal holder 20, two further second reference points 72 are provided, of which one is in the form of an YZ reference point 725. The same comprises an oblong hole 726 extending in the X direction x and also a contact surface 724 facing in the Z direction z, wherein the latter, as with the contact surface 724 already described above, can be brought to nominal size by removing material. As a counterpart to the oblong hole 726, a transverse rib (not shown) extending in the Z direction and Y direction y is provided here on the bumper 4 of the front end module, can have material removed in the Y direction y to adjust to nominal size and in the installation position engages in the oblong hole 726 in the Z direction z.

The last of the three second reference points 72 also comprises a contact surface 724 facing in the Z direction z with the honeycomb pattern, being designed to have material removed in the negative Z direction z. The removal of material to achieve nominal size can be carried out in each case by milling or grinding.

Figure 4:
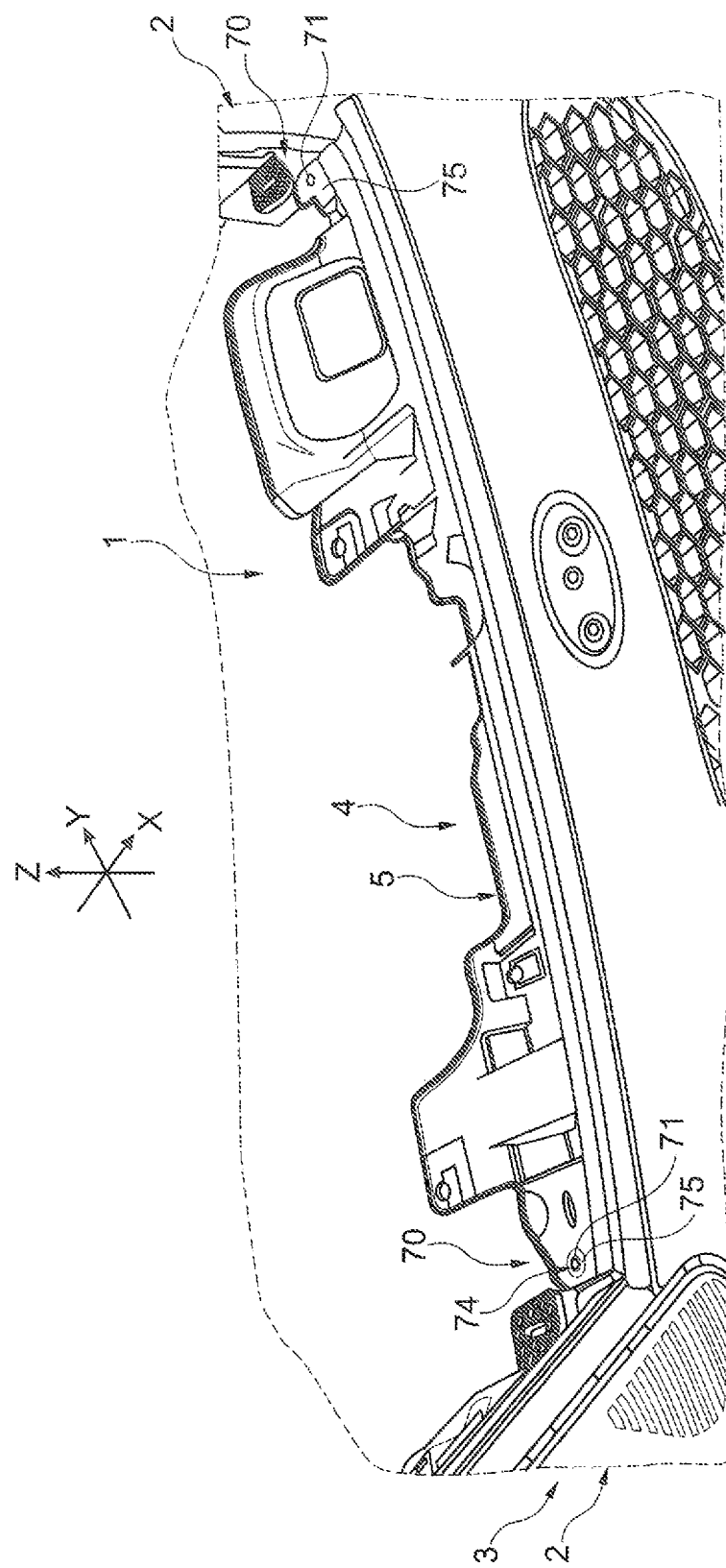
FIG. 4 is a perspective top view similar to FIG. 1, but with concealed components revealed.

As shown by way of example in FIG. 4, for the engagement of the attachment 5 at the first reference point 71 a suitable factory-provided connection 74 is provided here in the form of a pin 75 extending in the negative Z direction z, which engages in the reference opening 73 of the first reference point 71 in the installation position.

FIG. 7 illustrates an attachment, in the form of a headlamp 2 and one possible gauge or fixture 100 for identifying the reference points 71, 72. More specifically, the gauge 100 includes a base 102 and locators 104, 106, 108 for identifying the reference points 71, 72. The headlamp 2 is cradled or nested in the gauge 100 and the locators 104, 106, 108 precisely identify the points 71, 72 for machining the reference holes/openings 73, 726.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for alignment of an attachment relative to at least one adjacent structural part on a body side on a vehicle, wherein said apparatus is part of the at least one adjacent structural part, and the attachment comprises at least one first reference point for the alignment of the attachment, wherein (a) the first reference point is incorporated before installation of the attachment in said structural part, (b) the first reference point is a reference opening having a circular cross-section and (c) the reference opening is incorporated in a groove extending in an X direction for alignment.

2. The apparatus as claimed in claim 1, wherein the first reference point is designed for the alignment of the attachment in the X direction of the vehicle.

3. The apparatus as claimed in claim 1 further including at least one second reference point for the alignment of the structural part in the X direction, a Y direction and/or a Z direction.

4. The apparatus as claimed in claim 3, wherein at least one of said second reference points is designed to be adjustable in relation to an assigned vehicle direction or vehicle directions.

5. The apparatus as claimed in claim 3, wherein a first of said second reference points is designed as an XYZ reference point for alignment in the X direction, the Y direction and the Z direction, a second of said second reference points is designed as a YZ reference point for alignment in the Y direction and the Z direction and a third of said second reference points is designed as a Z reference point for alignment in the Z direction.

6. The apparatus as claimed in claim 5, wherein the XYZ reference point comprises a cross pin extending in the Z direction with mutually crossing ribs extending in the X direction or the Y direction as well as a contact surface that is positionally variable in the Z direction.

7. The apparatus as claimed in claim 5, wherein the YZ reference point comprises an oblong hole extending in the X direction and a contact surface that is positionally variable in the Z direction.

8. The apparatus of claim 5 wherein the Z reference point comprises a contact surface that is positionally variable in the Z direction.

9. The apparatus of claim 5 wherein the XYZ reference point comprises (a) a cross pin extending in the Z direction with mutually crossing ribs extending in the X direction or the Y direction as well as a first contact surface that is positionally variable in the Z direction, (b) the YZ reference point comprises an oblong hole extending in the X direction and a second contact surface that is positionally variable in the Z direction, and (c) the Z reference point comprises a third contact surface that is positionally variable in the Z direction.

10. The apparatus as claimed in claim 9, wherein at least one of the second reference points is in a form of a nominal holder for the structural part.

11. The apparatus as claimed in claim 1, wherein the attachment is a front end module comprising at least one paneling part of a bumper and/or the structural part is a headlamp.

12. The apparatus as claimed in claim 1, wherein the attachment is a front end module and two headlamps, each of said two headlamps with at least one first reference point, are provided for the alignment of the front end module, wherein in an installation position the first reference points are spaced apart from each other in a Y direction and/or in a Z direction.

13. A method for alignment of an attachment relative to at least one adjacent structural part on a body on a vehicle by means of an apparatus for the alignment of said attachment relative to said at least one adjacent structural part, comprising:
    inserting said at least one adjacent structural part on a nominal holder in a gauge;
    introducing at least one first reference point for the attachment into said at least one adjacent structural part;
    installing of the at least one adjacent structural part in the vehicle; and
    aligning of the attachment by contact with at least one first reference point on the at least one adjacent structural part.

14. The method as claimed in claim 13, wherein the at least one adjacent structural part comprises adjustable second reference points, wherein following the insertion of the at least one adjacent structural part on its nominal holder in the gauge and before the incorporation of the at least one first reference point in the at least one adjacent structural part, adjustment of the second reference points is carried out to adjust the at least one adjacent structural part in the gauge.

15. The method as claimed in claim 14, wherein two structural parts are used for the alignment of the attachment, wherein the two structural parts, after each has been provided in the gauge with the at least one first reference point for the attachment, are installed in the vehicle such that the adjustable second reference points are spaced apart from each other in the installation position, at least in relation to a vehicle direction that is not the same as the vehicle direction associated with the at least one first reference point.

* * * * *